(12) United States Patent
Mea

(10) Patent No.: US 10,183,628 B2
(45) Date of Patent: Jan. 22, 2019

(54) PORTABLE TRIFOLD ORGANIZER

(71) Applicant: Kathleen Mea, Aston, PA (US)

(72) Inventor: Kathleen Mea, Aston, PA (US)

(*) Notice: Subject to any disclaimer, the term of this patent is extended or adjusted under 35 U.S.C. 154(b) by 0 days.

(21) Appl. No.: 15/847,267

(22) Filed: Dec. 19, 2017

(65) Prior Publication Data

US 2018/0170273 A1 Jun. 21, 2018

Related U.S. Application Data

(60) Provisional application No. 62/436,190, filed on Dec. 19, 2016.

(51) Int. Cl.
  *B60R 7/05* (2006.01)
  *B60R 11/00* (2006.01)
  *A45C 11/00* (2006.01)

(52) U.S. Cl.
  CPC .......... *B60R 11/00* (2013.01); *A45C 11/00* (2013.01); *B60R 7/05* (2013.01); *B60R 2011/0035* (2013.01); *B60R 2011/0059* (2013.01)

(58) Field of Classification Search
  CPC ................ B60R 7/05; B60R 2011/0035
  USPC .......................................... 224/312; D12/417
  See application file for complete search history.

(56) References Cited

U.S. PATENT DOCUMENTS

| | | | | |
|---|---|---|---|---|
| 1,722,507 A * | 7/1929 | Stanley | ............... | A45C 11/008 132/312 |
| 2,839,860 A * | 6/1958 | Fry | ............... | B42D 5/042 296/97.5 |
| 2,931,114 A * | 4/1960 | Peterson | ............... | B60R 7/05 224/312 |
| 4,852,783 A * | 8/1989 | Bryden | ............... | A45C 7/0095 150/149 |
| 5,020,673 A * | 6/1991 | Adams | ............... | A45C 3/00 150/112 |
| 5,052,555 A * | 10/1991 | Harmon | ............... | A01K 97/06 190/111 |
| 5,165,544 A * | 11/1992 | Gusenoff | ............... | G11B 33/0422 206/308.3 |
| 5,195,668 A * | 3/1993 | Kunes | ............... | B60R 7/05 224/312 |
| 5,329,947 A * | 7/1994 | Shikler | ............... | A45C 11/008 132/291 |
| 5,345,633 A * | 9/1994 | Harnish | ............... | B60N 2/879 5/639 |

(Continued)

*Primary Examiner* — Justin Larson
(74) *Attorney, Agent, or Firm* — Volpe and Koenig, P.C.

(57) ABSTRACT

A portable trifold organizer adapted for attachment to an automobile sun visor having a plurality of pockets, a plurality of compartments with elastic straps for securing items within the compartments, and two bifolds to facilitate the trifold design. The plurality of pockets and plurality of compartments have various dimensions to accommodate articles selected for storage, and the two bifolds may have spacer regions to enhance storage capacity of the organizer. The plurality of elastic straps within the compartments has various dimensions to secure a variety of items within the organizer. The trifold design allows the organizer to fold into a size that provides for storage in an automobile door pocket storage compartment. An elastic strap with Velcro end secures the organizer in its folded position by wrapping around the body of the folded organizer and attaching to a Velcro attachment patch on the rear side of the organizer.

8 Claims, 5 Drawing Sheets

(56) References Cited

U.S. PATENT DOCUMENTS

| | | | | |
|---|---|---|---|---|
| 5,433,362 A * | 7/1995 | Battaglia | B60R 7/05 224/312 |
| D362,159 S * | 9/1995 | Singh | D12/417 |
| D395,637 S * | 6/1998 | Patterson | D12/417 |
| D402,624 S * | 12/1998 | Patterson | D12/417 |
| 5,890,587 A * | 4/1999 | Roegner | A45C 11/26 206/6.1 |
| 6,109,442 A * | 8/2000 | Roegner | A45C 11/00 150/106 |
| 6,168,022 B1 * | 1/2001 | Ward | A61F 13/84 206/440 |
| 6,209,918 B1 * | 4/2001 | Christopherson | G09F 21/04 283/51 |
| 6,250,470 B1 * | 6/2001 | Mackenzie | A01K 97/08 190/109 |
| 6,523,653 B2 * | 2/2003 | Roegner | A45C 3/00 190/109 |
| D504,367 S * | 4/2005 | Maxwell | D12/191 |
| D505,107 S * | 5/2005 | Bergh | D12/417 |
| D512,367 S * | 12/2005 | Eskandry | D12/417 |
| D550,961 S * | 9/2007 | Eskandry | D12/422 |
| D567,741 S * | 4/2008 | Chalek | D12/417 |
| 7,401,838 B2 * | 7/2008 | Morris | B60R 7/05 296/97.1 |
| 8,561,865 B2 * | 10/2013 | Mantis | B60R 7/05 224/312 |
| 8,727,653 B2 * | 5/2014 | Nelson | A45C 7/0054 206/214 |
| 8,739,442 B2 * | 6/2014 | Shape | A47G 1/0616 224/312 |
| D728,218 S * | 5/2015 | Goldstein | D12/417 |
| 2004/0094588 A1 * | 5/2004 | Klein | B60R 7/05 224/312 |
| 2005/0133554 A1 * | 6/2005 | Maupin | B60J 3/0204 224/312 |
| 2007/0235484 A1 * | 10/2007 | Staniszewski | B60R 7/05 224/312 |
| 2009/0180715 A1 * | 7/2009 | Wittke-Kothe | A45F 4/02 383/4 |
| 2010/0059560 A1 * | 3/2010 | Lanum | A61B 50/31 224/257 |
| 2017/0166136 A1 * | 6/2017 | Jones | B60R 7/05 |

* cited by examiner

PORTABLE TRIFOLD ORGANIZER

CROSS REFERENCE TO RELATED APPLICATIONS

This application claims the benefit of U.S. Provisional Application Ser. No. 62/436,190, filed on Dec. 19, 2016, the contents of which are hereby incorporated by reference herein.

FIELD OF INVENTION

The present disclosure relates to the field of organizers adapted to be mounted on an automobile sun visor, and more particularly to portable, folding organizers that also fit within automobile door pocket storage compartments.

BACKGROUND

Organizers that attach to the sun visor of an automobile are known in the art. Because organizers contain articles that are important to the user, significant aspects of the organizer include its ease of portability and storage. Because most sun-visor organizers are at least as big as the sun visor itself, the ease of portability and storage for such organizers is compromised, when the organizers are not configured to fold or collapse into a more convenient size. Accordingly, there is a need for a sun-visor organizer that provides additional functionality via folding capability. It would be advantageous if the portability of the organizer could also be supplemented with additional functionality to fold and fit within automobile door pocket storage compartments.

SUMMARY

There is provided according to the embodiments of the disclosure a trifold organizer including a portable trifold organizer adapted for attachment to an automobile sun visor having storage capacity via a plurality of pockets and plurality of compartments with elastic straps for securing items within the compartments. Further, the trifold organizer may include elastic bands for mounting on an automobile sun visor and elastic fasteners for securing a folded trifold organizer in its folded position. Finally, the trifold organizer may include two bifolds facilitating the trifold design for added functionality to fold and fit within automobile door pocket storage compartments.

The plurality of pockets and plurality of compartments with elastic straps may have various dimensions to accommodate articles selected for storage by the user, where the articles may be travel-sized cleaning, infant or child care products, for example.

In one aspect, at least one of the pockets may be made from a plastic material, where the plastic pocket contains an opening in the middle to dispense cleaning articles, such as plastic bags, tissues or cleaning wipes, for example.

In another aspect, one or more of the elastic bands may secure the organizer to an automobile sun visor.

In yet another aspect, the trifold design may allow the organizer to fold into smaller sizes for storage within the interior pocket storage compartments of an automobile.

In another aspect, one or more elastic fasteners may secure the organizer in its folded position, by wrapping around the body of the folded organizer and attaching at Velcro attachment points.

These and other objects, features and advantages of the present disclosure will be apparent from the following detailed description of illustrative embodiments thereof, which is to be read in connection with the accompanying drawings.

BRIEF DESCRIPTION OF THE DRAWINGS

A more detailed understanding may be had from the following description, given by way of example in conjunction with the accompanying drawings wherein.

DETAILED DESCRIPTION OF THE PREFERRED EMBODIMENTS

Various embodiments are described herein where like references to figures are used to describe like features. Each feature or element may be used alone without other features and elements or in various combinations with or without other features and elements.

The portable trifold organizer discussed herein provides the consumer with an organizer having enhanced functionality inside and outside of automobiles, as a travel-friendly, convenient way to transport and carry cleaning and child care supplies, without the hassle of cumbersome organizers that are not designed to fold and collapse into manageable sizes for portability and storage. The trifold organizer provides for improved mobility and functionality. These and other objects, features and advantages of the example trifold organizer will be described in further detail in the following illustrative embodiments thereof.

Figure 1:
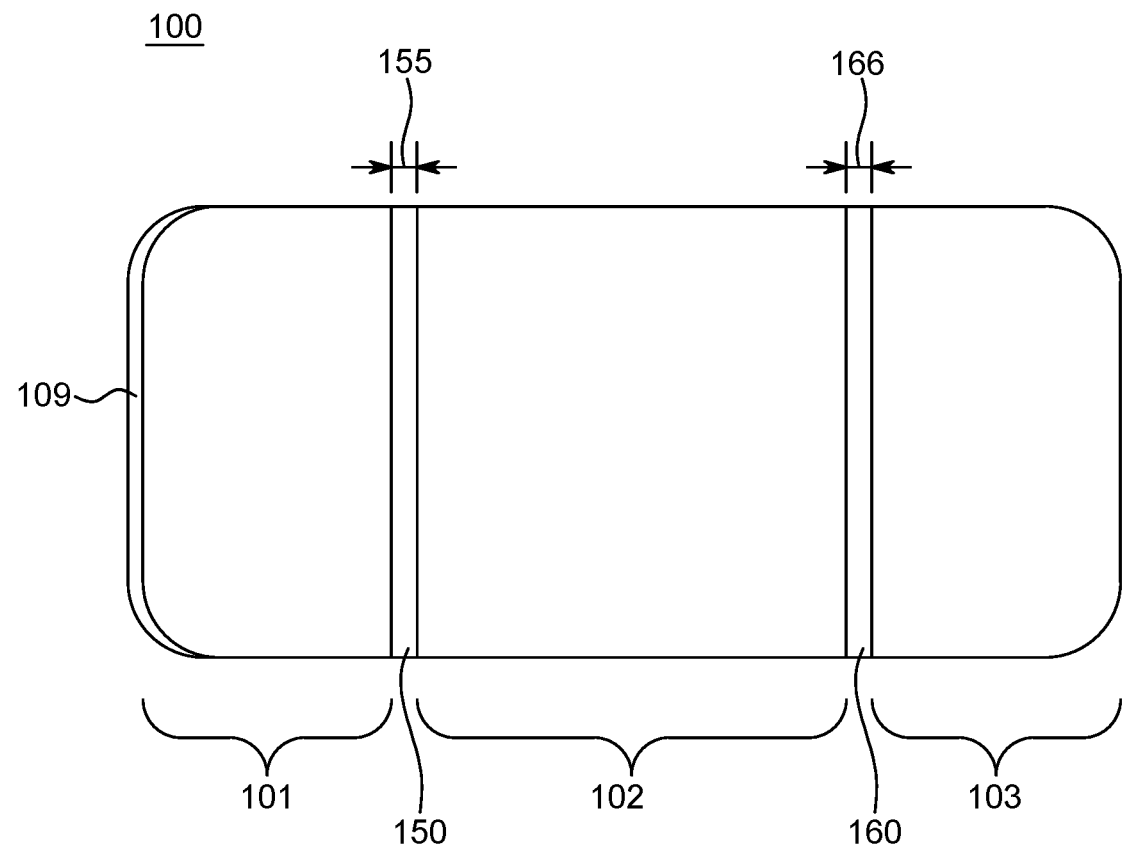
FIG. 1 shows a frontal-perspective view of the body of the portable trifold organizer with two bifolds defining the three sections of the organizer.

FIG. 1 is a diagram of the body of an example portable trifold organizer 100 in which one or more disclosed embodiments may be implemented. The trifold organizer 100 is adapted for attachment to an automobile sun visor and provides durability and flexibility for holding essentials within the organizer 100. The organizer 100 may be comprised of three sections, 101, 102 and 103. Sections 101 and 102 are separated by bifold 150, and sections 102 and 103 are separated by bifold 160. The three sections 101, 102 and 103 may comprise a firm shell configured to provide a supportive, protective case for the items stored within the organizer 100. Further, the bifolds 150, 160 may comprise a more flexible material, configured to facilitate folding of the three sections 101, 102 and 103 for storage of the organizer 100, within an automobile door compartment, for example. Each of the bifolds 150, 160 supports the trifold design and may include corresponding spacer regions 155, 166, respectively, to enhance the folding capability and storage capacity of the trifold organizer 100. More specifically, bifold 150 may comprise spacer region 155 to separate the bifold 150, and bifold 160 may comprise spacer region 166 to separate the bifold 160. Depending on the embodiment, the spacer regions 155 and 166 may comprise a width suitable to accommodate the paraphernalia stored within the organizer 100.

Referring again to FIG. 1, those skilled in the art would recognize that the material of the organizer 100 may comprise a hard nylon or other firm synthetic material that is strong, yet flexible, where necessary as described above. Further, the organizer 100 may include a depth 109 to accommodate the size and shape of the essentials to be stored within the organizer 100. The depth 109 may be variable between different embodiments of the organizer 100.

Figure 2:
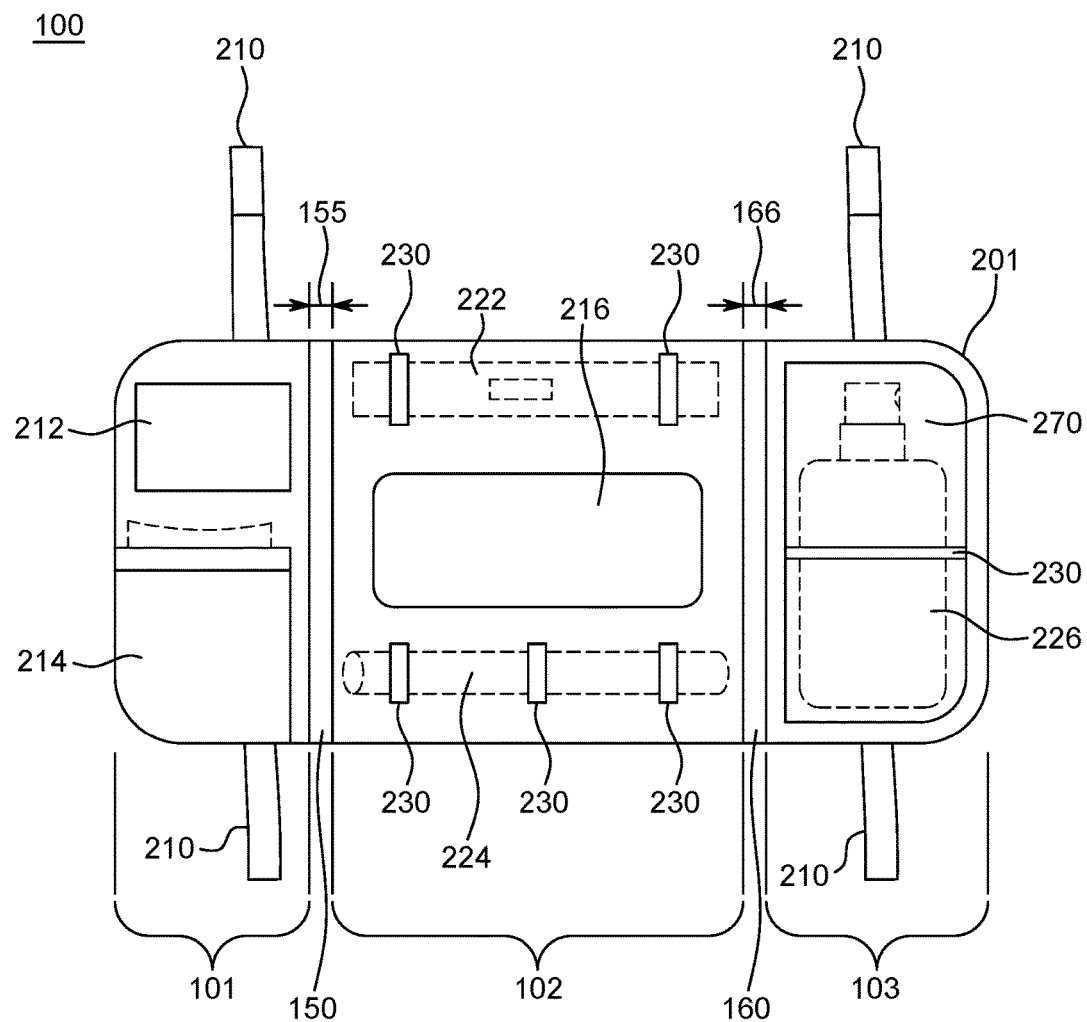
FIG. 2 shows a frontal-perspective view of the portable trifold organizer with a plurality of pockets and plurality of compartments with elastic straps.

Referring to FIG. 2 showing the front side 201 of the organizer 100, within the three sections 101, 102 and 103 of the organizer 100 may be a variety of pockets, compartments with elastic straps, and elastic bands configured for mobility and storage of cleaning and child care essentials. More specifically, the organizer 100 may include a plurality of elastic bands 210 configured to secure the organizer 100 to an automobile sun visor. In particular, the elastic bands 210 may be configured with an attachment mechanism, such as a snap, button or magnet, to fasten the organizer 100 to an automobile sun visor, for example. As shown in FIG. 2, the elastic bands 210 may be attached to the perimeter edge of sections 101 and 103. In another embodiment, the elastic bands 210 may also be attached to the perimeter edge of section 102. In addition, the organizer 100 may include a plurality of pockets 212, 214, 216 for holding paraphernalia and a plurality of compartments 222, 224, 226 with elastic straps 230 configured to secure items, as shown by dotted lines, within each compartment 222, 224, 226. As aforementioned, each of the bifolds 150, 160 with respective spacer regions 155, 166, facilitates folding of the organizer 100 and accommodates the paraphernalia stored within the pockets 212, 214, 216 and compartments 222, 224, 226 of the organizer 100. Further, each of the plurality of pockets 212, 214, 216 and compartments 222, 224, 226 may be comprised of a nylon or other synthetic material that provides durability and flexibility for holding essentials within the organizer 100. In one embodiment, the depth 109 may further enhance the storage capability of the pockets 212, 214, 216 and compartments 222, 224, 226. In another embodiment, additional essentials may also be attached to the front side 201 of the organizer 100, such as a lighted mirror or magnifying mirror.

Referring again to FIG. 2, each of the plurality of pockets 212, 214, 216 may be positioned within the organizer 100 at any position relative to the bifolds 150, 160 and plurality of compartments 222, 224, 226. In the embodiment shown in FIG. 2, pocket 212 may be configured to hold bleach or sanitary hand wipes, for example. Further, pocket 214 may be configured for storage of small, travel-sized car interior cleaning wipes used to clean cloth or leather. In another embodiment, pocket 216 may be configured with a mirror on the exterior surface of the pocket 216. In another embodiment, at least one pocket of the portable trifold organizer 100 may be made from a plastic material, where the plastic pocket contains an opening or slot in the middle to dispense cleaning articles, such as plastic bags, tissues or cleaning wipes, for example. In yet another embodiment, the capacity of the pockets 212, 214, 216 may be enhanced by providing additional storage space within the depth 109 of the organizer 100.

Each of the compartments 222, 224, 226 of the organizer 100 may be positioned within the organizer 100 at any position relative to the bifolds 150, 160 and plurality of pockets 212, 214, 216. The compartments 222, 224, 226 may comprise elastic straps 230 for securing essentials within a compartment. In one embodiment, the elastic straps 230 may have various dimensions in width and length to accommodate the articles selected for storage by the user. The elastic straps 230 secure articles to the organizer 100 within the compartments. Further, each of the compartments 222, 224, 226 may be configured to hold a specific cleaning essential. Compartment 226 may hold a bottle of glass cleaning solution, as shown by the dotted lines, where the elastic band 230 is configured to secure the bottle within the compartment 226. Compartment 226 may feature a receptacle space 270 within the depth 109 (shown in FIG. 1) of the organizer 100, configured for storage of a bottle within the compartment 226. Each compartment may include such receptacle space 270 within the depth 109, configured to accommodate the dimensions of the essentials to be stored within the organizer 100. Further, compartment 222 may be configured for storage of trash bags, where the elastic straps 230 of the compartment 222 provide for pop-up or single-roll pull-out capability. In addition, compartment 224 may be configured with elastic straps 230 for storage of a duster or spot pen.

Figure 3:
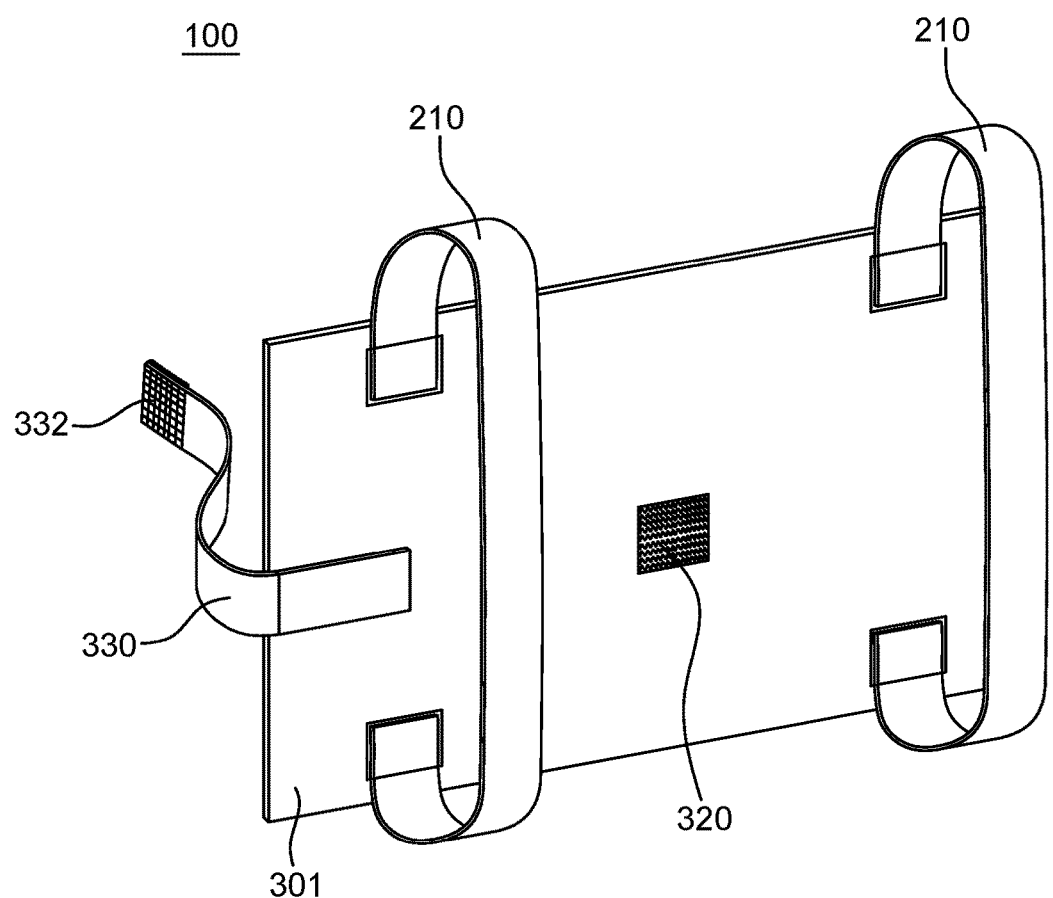
FIG. 3 shows a rear-perspective view of the portable trifold organizer with a Velcro patch and elastic fastener to secure the organizer in its folded position.

Referring to FIG. 3, the portable trifold organizer 100 includes a rear side 301 with a Velcro attachment patch 320 in the middle and an elastic fastener 330 having a first end and a second end. More specifically, the elastic fastener 330 may have a first end attached to the rear side 301 of the body of the organizer 100 and a second, Velcro end 332. To facilitate transportation and storage of the organizer 100, the elastic fastener 330 wraps around the body of the folded organizer 100, and the Velcro end 332 attaches to the Velcro attachment patch 320 to secure the organizer 100 in its closed, folded position. In one embodiment, the organizer 100 may have at least one elastic fastener 330 configured to secure the organizer 100 in its folded position, by wrapping around the body of the folded organizer 100 and attaching to at least one Velcro attachment patch 320. Depending on the embodiment, an elastic fastener 330 may have various dimensions in width and length to accommodate the articles selected for storage by the user. Further, FIG. 3 shows the elastic bands 210 (also shown in FIG. 2) that may be configured to secure the organizer 100 to an automobile car sun visor. The rear side 301 of the organizer 100 may also be comprised of a hard nylon or other firm synthetic material that provides durability and flexibility for holding essentials within the organizer 100.

Of course, the rear side 301 of the organizer 100 may also be comprised of three sections, 101, 102 and 103 (as shown in FIG. 1). Sections 101 and 102 of the rear side 301 may be separated by bifold 150, and sections 102 and 103 of the rear side 301 may be separated by bifold 160 (as shown in FIG. 1). Further, the elastic fastener 330 may be attached to the rear side 301 of section 101, or alternatively, to the rear side 301 of section 102. When the organizer 100 is in a closed, folded position, the Velcro end 332 may attach to the Velcro attachment patch 320, which may be located on the rear side 301 of section 102.

Figure 4:
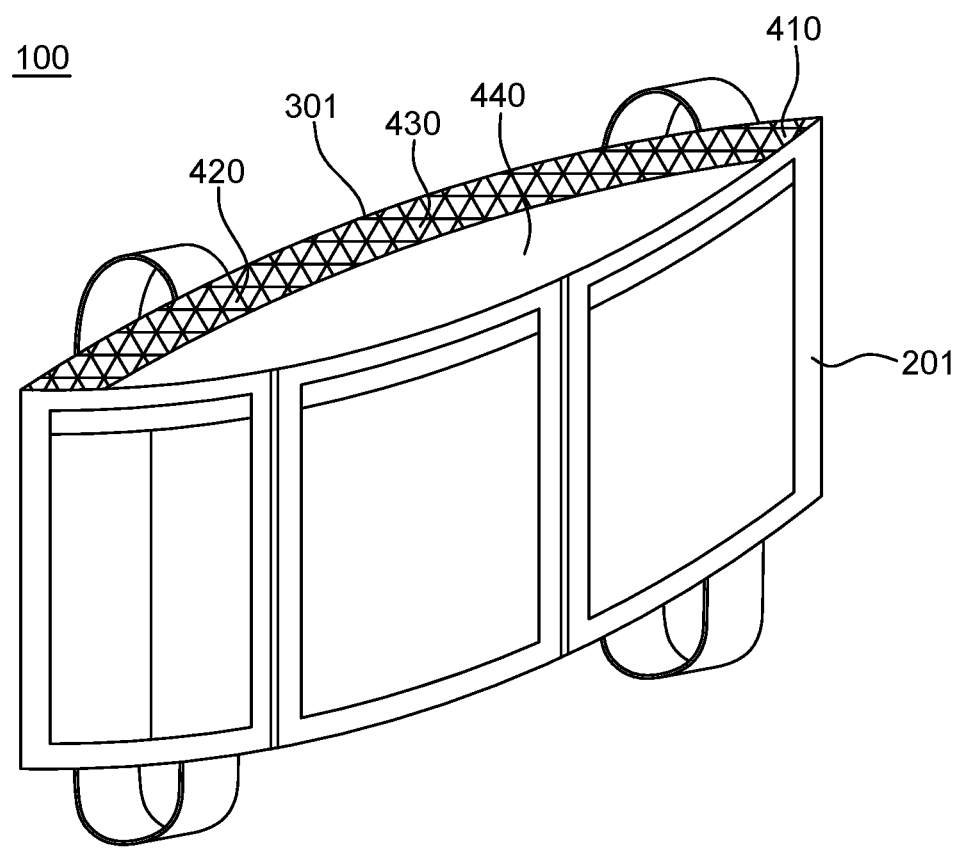
FIG. 4 shows a top-perspective view of the portable trifold organizer with a Velcro fastener along the entire seam that opens to form a pouch.

Referring to FIG. 4, the organizer 100 may have a top portion 410, where the front side 201 and rear side 301 couple to define a pouch 440 between the front side 201 and rear side 301. Further, a seam 430 may extend between the front side 201 and rear side 301 of the top portion 410 and may include a Velcro fastener 420 along the entire seam 430 that opens for access to the pouch 440. In one embodiment, the seam 430 may be configured to open to allow access to the pouch 440 by utilizing a zipper. The depth 109 (as shown in FIG. 1) may provide additional space between the front side 201 and rear side 301 to enhance the storage capacity of the pouch 440. In one embodiment, the pouch 440 may accommodate diaper storage, for example. In another embodiment, the pouch 440 may accommodate thin essentials, such as documents.

Figure 5:
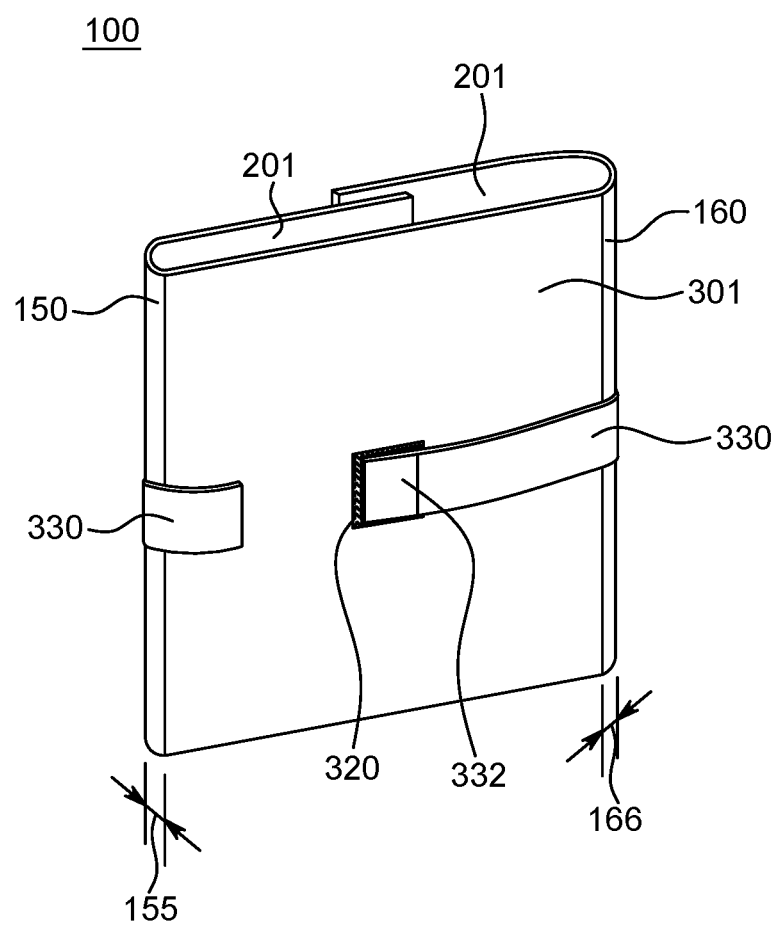
FIG. 5 shows the portable trifold organizer in its folded position with an elastic fastener wrapped around the body of the organizer to secure the organizer in its folded position.

FIG. 5 illustrates the organizer 100 in its folded position with an elastic fastener 330 wrapped around the body of the organizer 100 to secure the organizer 100 in a closed, folded position. The portable trifold organizer 100 includes a rear side 301 with a Velcro attachment patch 320 in the middle and an elastic fastener 330 with a Velcro end 332. A first end of the elastic fastener 330 may be attached to the rear side 301 of the organizer 100 and a second end of the elastic fastener 330 may include the Velcro end 332. To facilitate transportation and storage of the organizer 100, the elastic fastener 330 wraps around the body of the folded organizer 100 and attaches at the Velcro attachment patch 320 to secure the organizer 100 in its closed, folded position. Referring to FIG. 5 in conjunction with FIG. 1, the rear side 301 of the folded organizer 100 (as shown in FIG. 5) may also be comprised of three sections, 101, 102 and 103. The elastic fastener 330 may be attached to the rear side 301 of section 101, or alternatively, to the rear side 301 of section 102. When the organizer 100 is in a closed, folded position, the Velcro end 332 may attach to the Velcro attachment patch 320, which may be located on the rear side 301 of section 102.

Referring again to FIG. 5, the body of the folded organizer 100 may also include the elastic bands 210 (not shown) that may be configured to secure the organizer 100 to an automobile car sun visor. Of course, when the organizer 100 is removed from an automobile car sun visor and closed into a folded position, the elastic bands 210 may alternatively assist in securing the organizer 100 in the closed, folded position. As shown in FIG. 2, the elastic bands 210 may be attached to the perimeter edge of sections 101 and 103, so that when the organizer is in the closed, folded position, as shown in FIG. 5, the elastic bands 210 may further secure sections 101 and 103 and the contents within the organizer 100 in the closed, folded position.

What is claimed is:

1. A portable trifold organizer comprising:
   an oblong rectangular body having a perimeter edge with a length and a width, the oblong rectangular body including:
      a first section;
      a second section;
      a third section;
      a first folding mechanism extending parallel to the width;
      a second folding mechanism extending parallel to the width;
      a front side;
      a rear side;
      a plurality of elastic bands attached to the perimeter edges of the first and third sections;
   wherein the first and second sections are connected by the first folding mechanism and the second and third sections are connected by the second folding mechanism;
   wherein the first folding mechanism is operatively configured to fold the first section and the second folding mechanism is operatively configured to fold the third section to provide one of a folded organizer or an unfolded organizer;
   wherein the first and third sections of the organizer may be unfolded such that the first, second, and third sections are arranged in a single plane;
   wherein each of the plurality of elastic bands attached to the perimeter edges of the first and third sections is configured to secure each of the first and third sections of the unfolded organizer to a car sun visor, the car sun visor having a first side and a second side; and
   wherein the rear side of the unfolded organizer interfaces solely with one of the first or second sides of the car sun visor.

2. The portable trifold organizer of claim 1, wherein the first folding mechanism and second folding mechanism each include:
   a bifold having a first fold and a second fold; and
   a spacer region between the first fold and the second fold;
   wherein the spacer region is operatively configured to provide a distance between the first fold and the second fold; and
   wherein the distance between the first fold and second fold provides a storage capacity of the portable trifold organizer.

3. The portable trifold organizer of claim 1, the oblong rectangular body further including a mirror attached on the front side.

4. The portable trifold organizer of claim 1, wherein each of the plurality of elastic bands includes a coupling mechanism configured to detachably couple a first elastic band to a second elastic band.

5. The portable trifold organizer of claim 1, wherein the oblong rectangular body includes:
   a seam extending along the length of the perimeter edge operatively configured to detachably couple the front side to the rear side, to provide a pouch between the front side and rear side;
   the front side, including:
      a plurality of pockets; and
      a plurality of compartments;
   the rear side, including;
      an elastic fastener having a first end connected to the width of the perimeter edge and a second end having an attachment end mechanism; and
      an attachment means operatively configured to receive the attachment end mechanism of the second end of the elastic fastener;
   wherein the elastic fastener connected to the rear side is operatively configured to wrap around the body of the folded organizer and attach to the attachment means on the rear side of the body.

6. The portable trifold organizer of claim 5, wherein each of the plurality of compartments includes:
   a plurality of elastic straps configured to secure items to the front side of the body.

7. The portable trifold organizer of claim 5, wherein an exterior surface of at least one of the plurality of pockets includes a plastic surface having an opening;
   wherein the opening is operatively configured to dispense a cleaning item.

8. The portable trifold organizer of claim 5, wherein the seam includes a zipper operatively configured to detachably couple the front side to the rear side, to provide the pouch between the front side and rear side.

* * * * *